(No Model.)
C. W. ZIMMER.
BICYCLE SADDLE.
No. 478,184. Patented July 5, 1892.
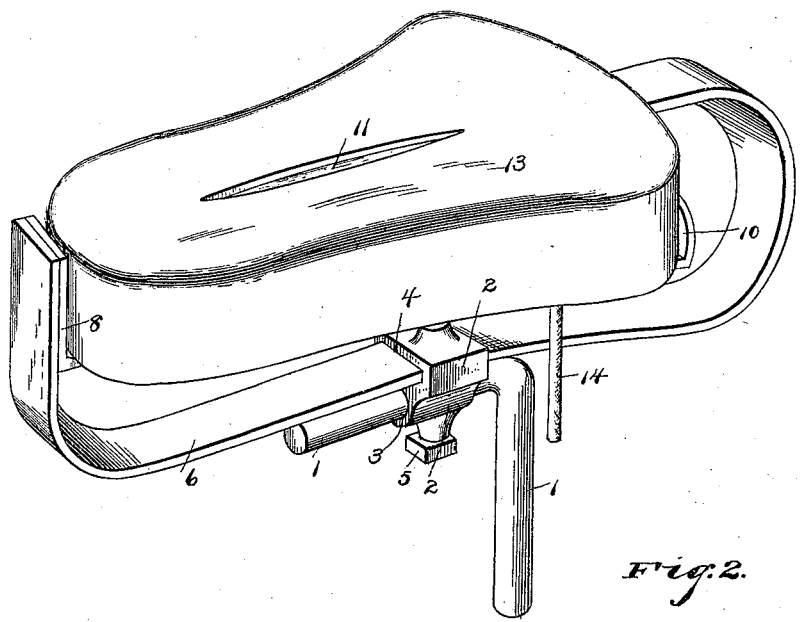
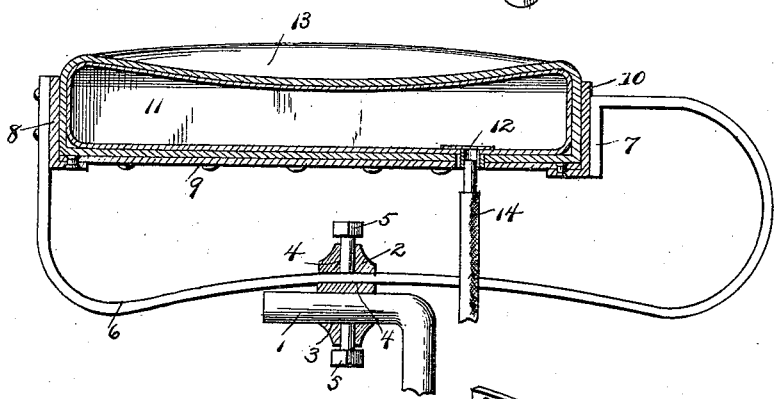
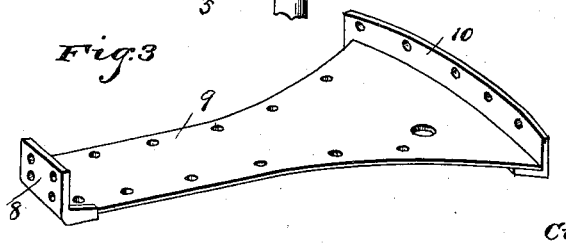
Witnesses
Inventor
Cyrus W. Zimmer
By his Attorneys,
C. A. Snow & Co.

UNITED STATES PATENT OFFICE.

CYRUS W. ZIMMER, OF LOGANSPORT, INDIANA.

BICYCLE-SADDLE.

SPECIFICATION forming part of Letters Patent No. 478,184, dated July 5, 1892.

Application filed January 22, 1892. Serial No. 418,937. (No model.)

*To all whom it may concern:*

Be it known that I, CYRUS W. ZIMMER, a citizen of the United States, residing at Logansport, in the county of Cass and State of Indiana, have invented a new and useful Bicycle-Saddle, of which the following is a specification.

This invention relates to improvements in bicycle-saddles; and more particularly to that class thereof which depend upon confined air for their elasticity.

The objects of my invention, together with the novel features thereof, will hereinafter appear, and be particularly pointed out in the claims.

Referring to the drawings, Figure 1 is a perspective of a bicycle-saddle constructed in accordance with my invention. Fig. 2 is a longitudinal section of the same. Fig. 3 is a detail in perspective of the saddle-supporting frame.

Like numerals of reference indicate like parts in all the figures of the drawings.

1 designates the usual inverted-L-shaped seat or saddle-standard employed in tricycles, and that class of bicycles termed "Safeties," and upon the upper horizontal portion of the same there is adjustably mounted a sleeve or collar 2. The sleeve or collar 2 is provided with a cylindrical bore 3, through which the standard passes, and above the same with a rectangular bore 4. Into both of these bores extend set-screws 5, the lower set-screw or collar serving to adjust the sleeve upon the standard, while the upper set-screw is for a purpose hereinafter apparent. Through the rectangular bore there passes a flat spring 6, which beyond the collar has its ends upturned, as shown. The rear end of the spring terminates in a downwardly-bent portion or securing-plate 7, while the front end supports an L-shaped bracket 8.

9 designates a metal saddle-plate, the front end of which is riveted to the metal bracket 8 and the rear end of which is riveted to a similarly-shaped bracket 10, which is secured to the downwardly-bent rear end of the spring. This saddle-plate when viewed in plan resembles, though is somewhat narrower, than an ordinary saddle.

The saddle proper or seat consists of a rubber cushion or bag 11, having a saddle shape and provided with a valved inlet 12. This rubber cushion is located within a leather jacket 13, which in turn is riveted to the saddle-plate. The air-inlet of the cushion registers with openings formed in the leather covering and the saddle-plate.

By introducing a tube 14 through the openings of the saddle-plate, leather covering, and rubber cushion the rider may expand the rubber cushion to the desired degree, giving to the same and the leather covering the desired tension, so that riders of varying weights may use the saddle, regulating the same to their necessities. It will be seen that the cushion will be maintained in position against any wabbling and that the leather covering will yield to every movement of the limbs of the rider and conform to the shape of the rider, thus obviating friction and lending great ease to the occupant of the saddle. The saddle itself will lend the desired elasticity, while the suspension-frame will absorb the jar of the machine and render the riding comfortable.

Having described my invention, what I claim is—

1. The combination, with the suspension-spring and means for securing the same to the seat-standard, of a metal saddle secured between the opposite terminals of and supported by the spring, the air-cushion, and the leather covering for the same mounted upon said saddle, substantially as specified.

2. In a saddle, the combination, with the suspension-spring having the upturned ends, the L-shaped brackets secured to the ends of the spring, and the perforated saddle-plate secured to the brackets, of the air-cushion having the vent and the leather covering secured to the plate and brackets and having an opening in line with the vent of the cushion and opening of the saddle-plate, substantially as specified.

3. The combination, with the inverted-L-shaped standard, the sleeve or collar having the lower cylindrical bore receiving the standard and the upper rectangular bore, and the screws terminating in the bore, of the suspension-spring loosely fitting the rectangular bore and having its front end upturned and its rear end upturned or curved and terminating in a downwardly-disposed securing-plate, the front and rear L-shaped brackets, the metal saddle-plate riveted to the lower edges of the brackets, the saddle-shaped cushion, and the leather covering for the same, the latter being riveted to the saddle-plate, substantially as specified.

4. The combination, with the suspension-spring having front and rear upturned ends, of a metal saddle-plate secured at its ends to the ends of the spring and a saddle mounted on the plate, substantially as specified.

In testimony that I claim the foregoing as my own I have hereto affixed my signature in the presence of two witnesses.

CYRUS W. ZIMMER.

Witnesses:
C. J. PAUTON,
E. F. KELLER.